(12) United States Patent
Laurila

(10) Patent No.: US 6,760,012 B1
(45) Date of Patent: Jul. 6, 2004

(54) METHOD AND MEANS FOR EDITING INPUT TEXT

(75) Inventor: Kari A Laurila, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/472,864

(22) Filed: Dec. 27, 1999

(30) Foreign Application Priority Data

Dec. 29, 1998 (FI) .................................................. 982816

(51) Int. Cl.$^7$ .............................................. G09G 5/00
(52) U.S. Cl. ..................................... 345/169; 345/170
(58) Field of Search ................................. 345/169, 170, 345/810; 710/67; 434/323; 705/30; 382/311

(56) References Cited

U.S. PATENT DOCUMENTS

| | | | | |
|---|---|---|---|---|
| 4,385,291 A | * | 5/1983 | Piguet | 345/173 |
| 4,709,387 A | * | 11/1987 | Masuda | 379/354 |
| 5,067,103 A | * | 11/1991 | Lapeyre | 708/146 |
| 5,543,818 A | * | 8/1996 | Scott | 345/168 |
| 5,818,437 A | | 10/1998 | Grover et al. | 345/326 |
| 5,943,655 A | * | 8/1999 | Jacobson | 705/30 |
| 6,107,986 A | * | 8/2000 | Kennard et al. | 345/30 |
| 6,204,848 B1 | * | 3/2001 | Nowlan et al. | 345/810 |
| 6,286,064 B1 | * | 9/2001 | King et al. | 710/67 |
| 6,302,698 B1 | * | 10/2001 | Ziv-El | 434/323 |
| 6,310,609 B1 | * | 10/2001 | Morgenthaler | 345/170 |
| 6,370,282 B1 | * | 4/2002 | Pavley et al. | 382/311 |
| 6,483,913 B1 | * | 11/2002 | Smith | 379/368 |

FOREIGN PATENT DOCUMENTS

| | | |
|---|---|---|
| EP | 0733963 A2 | 9/1996 |
| EP | 0860971 A2 | 8/1998 |
| EP | 0860971 | 8/1998 |
| GB | 2266797 | 11/1993 |
| WO | WO 97/05541 | 2/1997 |
| WO | WO 97/50264 | 12/1997 |

OTHER PUBLICATIONS

Patent Abstracts of Japan, Publication No. 08077162.

* cited by examiner

*Primary Examiner*—Amare Mengistu
*Assistant Examiner*—Prabodh M. Dharia
(74) *Attorney, Agent, or Firm*—Perman & Green, LLP

(57) ABSTRACT

A string of symbols of a defined length from input text is arranged onto a display in a constellation, which corresponds to the configuration of the keys on a device's keyboard. In order to edit the string displayed in the constellation, the symbol of the string to be corrected at any one time is selected by pressing once the key that corresponds to it according to locational correspondence between the constellation and the configuration of the keys on the keyboard. The selected symbol may also be replaced. In addition, with each new use of the key the symbol is replaced with one other symbol and in this way the desired symbol is selected with sequential presses of the key.

10 Claims, 5 Drawing Sheets

METHOD AND MEANS FOR EDITING INPUT TEXT

FIELD OF THE INVENTION

The present invention relates to an input device with a memory and a user interface, which comprises a display unit and a keyboard comprising several keys, which can be used to input text. Particularly the present invention relates to the editing of erroneous text on this device and a method for editing the erroneous text by using the input device.

BACKGROUND OF THE INVENTION

A mobile communication unit is an example of an input device, which comprises a keyboard with a limited number of keys. In several mobile communication standards used presently it is possible to send a short textmessage from the user terminal or mobile communication unit to e.g. another mobile communication unit, which supports reception of such messages. The most common mobile communication units are hand-held mobile phones, a good example of which are Nokia 2110 and Nokia 6110 mobile phones. In addition to the keys reserved for starting a call and using menu functions, mobile phones often contain a familiar button-telephone-like keyboard with 12 keys arranged in matrix of four rows by three columns: numbers 1–9 and *, 0 and #. For writing of SMS-messages, most of the number keys (2–9, 0 and #) in Nokia 2110 mobile phone can be used to produce letters and other symbols. In this case, a part of the producible symbols reside "under" each key, e.g. in order first three letters, then the number of the numeric keyboard and after these two or three special symbols. In this case a desired symbol is selected by pressing a key several times in a row without exceeding a certain period of time between presses. In this way it is possible to produce e.g. letter 'B' by pressing number key 2 twice in a row. When continuing to write the word BART, the user is required to wait a while and then press number key 2 once to produce letter 'A'. Then the user can continue and press number key 7 without waiting. The first press produces letter 'P', a second press changes 'P' to 'R', which is now accepted by waiting a while or by continuing by inputting letter 'T' by pressing another number key. Letter 'T' is the first letter to be produced with number key 8, so it will be input with only one press of number key 8. To correct an error, a cursor is displayed on the display of the mobile phone in addition to the text, which cursor can be moved within the text and beside or under which a symbol can be removed by pressing correction key C. The presented method of writing an SMS-message is easy to learn, but using it is laborsome and slow.

To ease typing on a limited keyboard, several different probability-based or guessing systems have been developed to guess the words meant by the user, when he/she inputs text without specifying which letter of a given key he/she means when pressing that key. These systems are aimed to avoid or at least reduce the need for repeated keypresses. One probability-based system based on a statistical model to feed text has been presented in the patent publication GB 2 266 797 B, "Data Storage Apparatus". The publication presents a system, where e.g. a mobile phone searches its memory for such words, every symbol of which is included in partial sets of letters corresponding to different keys, selected by the user by pressing number keys. The phone selects the most probable word for an input word. Statistical methods can be used to significantly speed up the writing of an SMS-message, but the downside of their use is that they can guess the word totally wrong too. In this case it is possible that the second and fourth letter of a five-letter word have been guessed wrong, and the meaning of the word is thus totally altered. The editing function supported by the SMS composition function of the present mobile communication units would require the user to move the cursor to the correct location symbol by symbol, erase the erroneous symbol and input a correct symbol in a way familiar from e.g. Nokia 2110. Thus as the statistical method possibly produces several erroneous letters, the speed advantage of the statisticality is lost or at least a part of it is lost. While writing the user may also notice that e.g. a word should be added before the latest written word e.g. in English an article should be added or changed and thus add a new letter into the article preceding the word.

SUMMARY OF THE INVENTION

Now a method and means have been developed to edit input text, where a defined amount N of keys of a number keyboard of a telephone are arranged to correspond the same amount N of displayed symbols. By pressing one of these keys the user can select a symbol corresponding to that key as a correction point. Optionally the symbol at the correction point can be replaced with another symbol without a separate command from the user. Preferably, the said N displayed symbols are the N latest input symbols. Preferably the same keys of the number keyboard or a part of those keys that were used to input the text are used for this kind of targeting or optionally the targeting and the automatically following editing. Preferably the editing is started by shifting into a dedicated editing mode e.g by pressing a key provided for this purpose, normally not use for typing, e.g. the asterisk key (*). Preferably the editing mode is exited by pressing a certain key or after a defined time has elapsed from the last keypress. The advantage of an editing method according to the present invention is that an editing more efficient than the prior art is reached, because the cursor does not have to be moved by one single symbol at a time but its position can be selected as per the invention from N edited symbols by pressing one key that corresponds a desired new position of the cursor.

According to a first embodiment of the invention there is provided a method for editing input using an input device, which comprises a keyboard to input text and a display unit to display the input text, the method comprising the steps of:

displaying no more than a first number of symbols from the input text on the display unit grouped according to a first matrix, grouping the said first number of keys of the keyboard to editing keys according to a defined second matrix;

defining a singular correlation, where every editing key corresponds to one position of a grouped symbol, between the symbols grouped according to said first matrix and the positions of the editing keys grouped according to said second matrix; and selecting a position of a grouped symbol corresponding to an editing key as the editing position as a response to the use of the editing key, wherein the input device is a button telephone and the keyboard is the number keyboard of a telephone.

According to a first embodiment of the invention there is provided an input device, which has a keyboard to input text and a display unit to display the input text, which input device comprises first means for displaying at most the first number of symbols from the input text grouped according to a first matrix on the display unit, wherein said keyboard comprises a first number of keys grouped as editing keys according to a second matrix; and the input device further comprises:

means for defining a singular correlation, where each key corresponds to one position of a grouped symbol, between symbols grouped according to said first matrix; and editing keys grouped according to said second matrix;

means for selecting the position of the group symbol corresponding to the editing key as the editing position as a response to the use of an editing key wherein the input device is a button telephone and the keyboard is a telephone's number keyboard.

In method for editing input text according to a second embodiment of the present invention as a response to a defined first command given with a certain key, a grouped symbol in an editing position is replaced with an other symbol from a symbol group of a basic key producing the grouped symbol, and as a response to a command given with an other certain key a new basic key is selected to replace the group of symbols changeable to the position of the symbol to be edited and the grouped symbol is replaced with one symbol from the symbol set of the new basic key.

A device according to a second embodiment of the present invention has been arranged as a response to a certain first manner use of a key to replace a grouped symbol in an editing position with an other symbol from the symbol set of the key that produces the grouped symbol, and as a response to a certain manner use of a key to read a next key as a new basic key and replace the edited symbol with one of the symbols input with the new basic key, i.e. one of the symbols under the basic key.

In method for editing input text according to a third embodiment of the present invention editing a grouped symbol in an editing position is allowed and after editing the grouped symbol in the editing position is replaced by a correcting symbol, for which correcting symbol a symbol that belongs to the same set as the symbol to be edited and most probably corrects the text to conform to a defined rule is selected.

In a third embodiment of the present invention the device allows editing of a symbol in an editing position and after the editing it is arranged to search for a probable word conforming to the editing and displaying it in place of the edited word. Preferably the user is also allowed to cancel the search of a probable word and return the pre-editing word.

In method for editing input text according to a fourth embodiment of the present invention replacing a symbol to be edited with another starts a search for the most probable word to replace the word in the input text that said symbol to be edited belonged to.

In a device according to a fourth embodiment of the present invention the search for a probable word following an editing is a default action that is always carried out after editing.

In method for editing input text according to a fifth embodiment of the present invention at least one probably incorrect symbol is searched from the symbols to be edited, and it is displayed in a manner differing from the other symbols to be edited. In this way the user is presented with a symbol, the correction of which is probably most profitable.

A device according to a fifth embodiment of the present invention is arranged to automatically search a probably incorrect symbol. A probably incorrect symbol is that symbol within the a text to be edited that most effects a selection of the symbols of the edited text and/or the replacing of which symbol most probably singularly points an originally meant word. The device is arranged to point out such a probably incorrect symbol preferably by displaying it in a way that differs from the other symbols displayed in the editing mode thus instructing the user to correct it first. In this manner the amount of editing needed can be minimized by starting editing with a change that most probably will lead to the correct word with one or the least number of changes, even if it had several misguessed symbols before entering the editing mode.

As a benefit of the present invention editing the input text becomes quicker as it is no longer necessary to move the cursor symbol by symbol to the erroneous symbols when editing the input text. The benefit is significant particularly when a limited keyboard is used and when editing a text recognised by statistical means. Another benefit of the present invention is that an editing method according to the present invention can well be used as an alternative to traditional editing methods. As a third benefit of the present invention, when using an editing method according to the invention, it is not necessary to allocate separate keys for moving the cursor, and so they can be left out and so save in the manufacturing cost of the device and/or manufacture a keyboard more efficient in its use of space. Preferably in this case a subsection of the keyboard, at least one key is reserved to scroll the text input during the editing mode in order to the browse the text to be edited in the editing mode. Furthermore an advantage of the embodiments 2 . . . 5 is that the selection of the symbol to be edited and replacing it with another symbol can be combined to occur simultaneously, thus further reducing the amount of keypresses needed.

Here the present invention has been described using a mobile communication unit and an SMS written on it as an example. The present invention can of course be applied to writing other text such as calendar or phonebook entries and to other devices than mobile communication units, e.g. PDA-devices (Personal Digital Assistant) with a limited keyboard, process automation devices, which cannot have a full-sized keyboard due to size, maintenance, special protection or other constraints, video games and vehicle computers, for the use of which only limited keyboard is available in e.g. the console of the car.

BRIEF DESCRIPTION OF THE DRAWINGS

In the following the present invention is described in detail referring to enclosed figures, using a mobile communication unit as an example in the description, without, however, limiting the present invention to this application, of which figures

DETAILED DESCRIPTION

Figure 1:
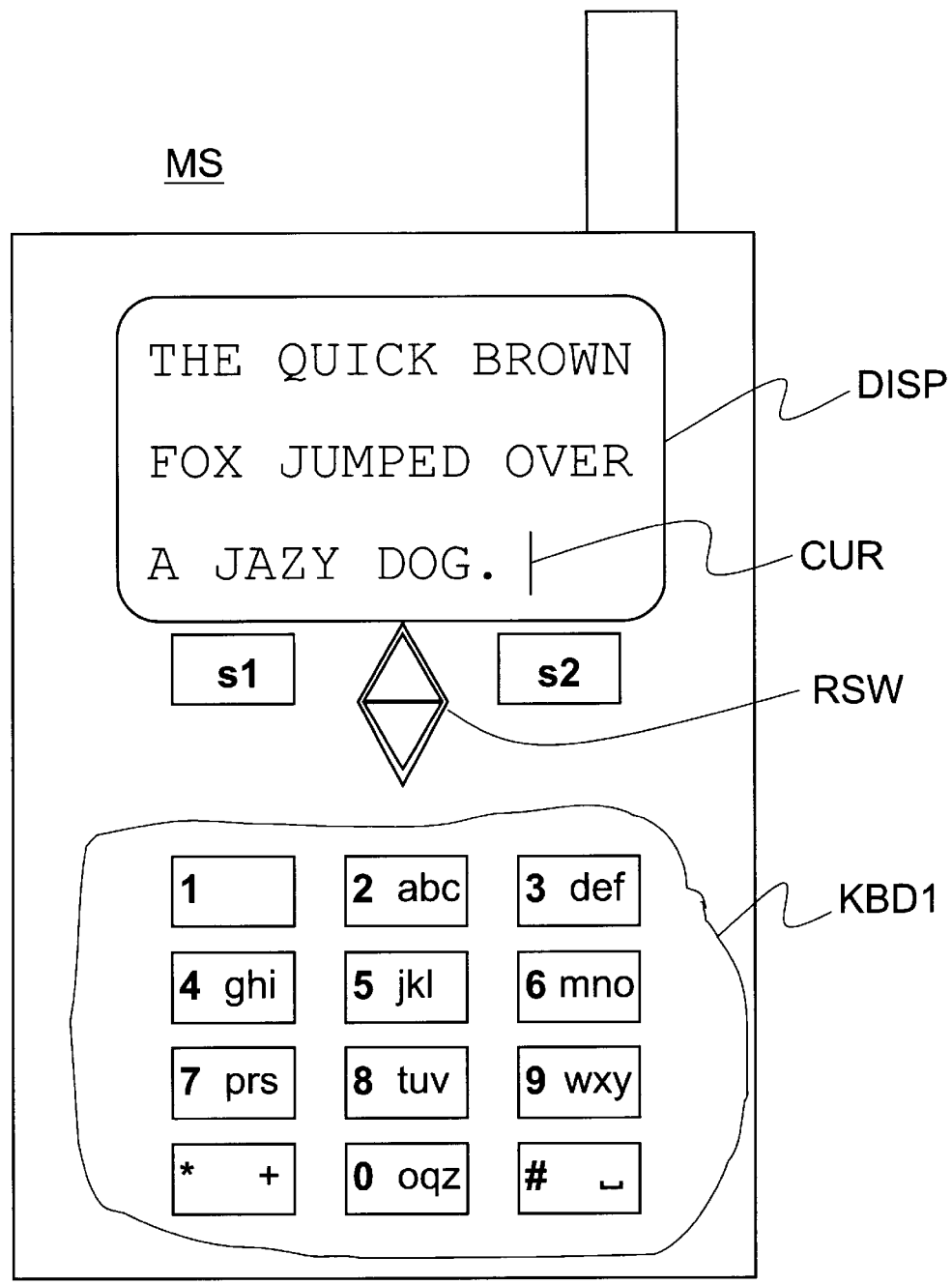
FIG. 1 presents a front view of a mobile communication unit according to a first embodiment of the present invention.

FIG. 1 presents a frontal view of an erect mobile communication unit according to a first embodiment of the present invention. In the proximity of an upper edge of the mobile communication unit is the display unit DISP. An erroneous message "THE QUICK BROWN FOX JUMPED OVER A JAZY FOX" is presented as a text on the display and the cursor CUR is presented at the end of the text as a vertical line. Below the display unit there is a group of function keys, which comprises two soft keys, the functions of which can be defined by means of software, and rocker switch RSW. Below the function keys there is a keyboard KBD1 familiar from button telephones, which keyboard comprises the number keys 1–9, the asterisk *, zero 0 and the hash sign #. As presented in the figure, the alphabet from a to z has been placed in conjunction with keys 2–9 and 0. "Under" each key reside three different letters, i.e. with each key it is possible to produce any one of the three letters designated in conjunction with the key. When typing the word "THE" with the mobile communication unit in the figure using a method known from prior art key 8 is pressed once, key 4 twice in a row and key 3 twice in a row. Thus the word "THE" is input with the keypress sequence 8,4,4,3 and 3. Here the key that produces a group of symbols is called a basic key. Preferably a statistical word identification is implemented in the mobile communication unit, in which identification a word can be input without sequential keypresses, i.e. by pressing the basic key of each symbol, in this keys with the sequence 8,4 and 3. When inputting text, the hash sign key in the mobile communication unit in the figure is arranged to function either as the hash sign key or the space key. The key 1 is arranged to display a list of special and punctuation symbols on the display, but the key * has no function when typing text. It must be understood, though, that the key configuration presented here is only one example and that the present invention is not limited to what is presented here. It must also be understood that even though the most common symbols (the alphabet) produced by the keys have been drawn on the keys for explanatory purposes when illustrating the invention, the markings are not essential to the invention.

Figure 2:
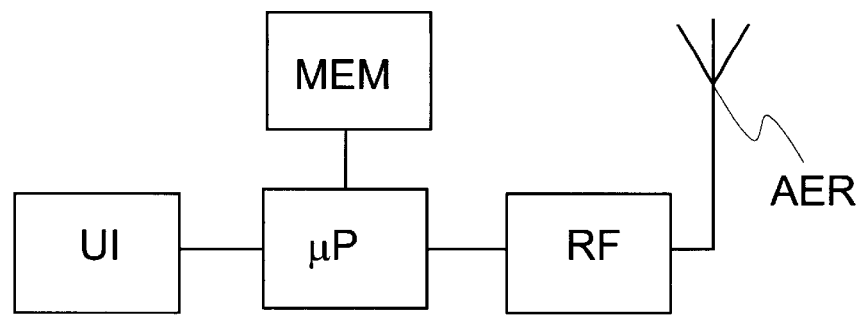
FIG. 2 presents a block diagram of the parts essential to the operation of the mobile communication unit in FIG. 1.

FIG. 2 presents in a block diagram form the parts essential to the operation of a mobile communication unit MS in FIG. 1, that are processor µP and the parts operationally connected to it: user interface UI, comprising the display and the keys, memory M comprising the non-volatile memory (ROM, Read Only Memory) and working memory (RAM, Random Access Memory), and radio unit RF and antenna AER connected to it. Preferably processor µP is a microprocessor or a digital signal processor DSP. The software of the mobile communication unit has been saved in memory and the processor controls the operations of the mobile communication unit, such as the use of the radio unit and presenting messages on the user interface and reading input from the user interface on basis of the software. The arrangement according to the present invention is implemented by software. Optionally the present invention can be partially or wholly implemented with electronics manufactured for the purpose.

Figure 3:
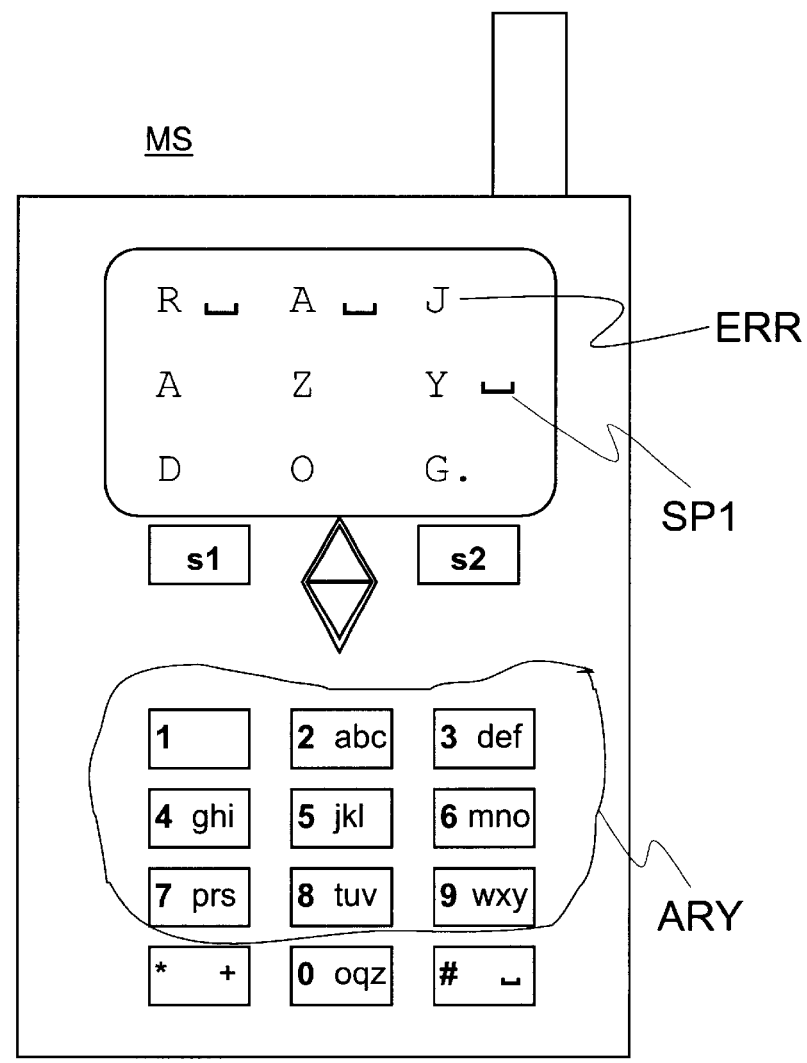
FIG. 3 presents the mobile communication unit in FIG. 1 in editing mode.

FIG. 3 presents the mobile communication unit of FIG. 1 in editing mode. To initiate the editing mode the user has first used the editing mode initiating key (asterisk key) in the situation where the cursor is in the end of the message, as presented on the display of FIG. 1. Optionally the command to enter editing mode can be given by other means known from prior art, e.g. by menu functions or by using two keys essentially simultaneously. The 3×3 i.e. 9 symbols preceding the cursor in FIG. 1 have been copied on the editing mode display into a defined format, here a 3×3 matrix. The format is preferably geometrically regular, but optionally it can be something else, as long as the user can identify the correspondence between the symbols and the keys used to edit the text. A preferable, but not essential additional feature of the present invention where the symbols to be edited in the editing mode are only letters, not spaces or punctuation marks, has been applied here. From the message in figure one, the following text is being copied to be display on the screen:

"R A J

A Z Y

DOG."

Preferably, but not essentially the omitted spaces are represented by a symbol, e.g. a square bracket SP1 tilted to a horizontal position, preferably without changing the spacing of the symbols. Preferably punctuation marks are presented in a similar way without changing the spacing of the symbols in order to improve the legibility of the text, like e.g. the last period in the example. The third letter of the edited text, the erroneous symbol ERR, here the letter J, that is in the place of the L that begins the word "LAZY", is to be replaced with an L. The symbol to be edited is select in the editing mode of the mobile communication unit by pressing the key in the layout the part of the keyboard ARY that corresponds to the position of the symbol to be replaced. In this case the key used in replacing the symbol is the key in the upper right-hand corner, i.e. the key 3. Said part of the keyboard comprises a matrix, e.g. 3×3 keys, of the keyboard. Alternatively it is possible to implement a matrix of some other size, e.g. 4 rows and 3 columns by using also the lowest keyboard row of keys *, 0 and #, which matrix is preferably not larger that the matrix of symbols that fits on the display at a time. However, if a matrix larger than the matrix of available keys is presented on the display, the user must be given means to shift the projection of the keyboard matrix corresponding to the display matrix. For example, if the device comprises so-called arrow keys, the effective area of the key matrix i.e. projection to the matrix displayed on the display can easily be shifted by using them, where the matrix used is preferably visualized with e.g. a frame surrounding the projection of the keyboard matrix on the display matrix of the edited symbols.

If the asterisk key is selected both as the exit key of the editing mode and a targeting key as a part of the keyboard matrix ARY, the editing mode can be exited by pressing the star key twice, because in this case the star key is not meant to produce symbols and thus cannot be used to select the correct symbol for the symbol in the targeted position.

One special instance of the positional correspondence between the key matrix and the symbols presented on the screen is an arrangement, where the keys are set in a matrix and the symbols on the screen are arranged in a row. In this case the rows of keys are thought of as being joined one after another like a row on the screen. Even though the intuitivity of the system is reduced in this case, this arrangement can be necessary e.g. in a case where text can be displayed on the display of a mobile communication unit only in one row e.g. because of the small size of the mobile communication unit. A contrary method can also be used, it is possible e.g. to use a single-row keyboard or one row of the keyboard with a text arranged in a matrix. Furthermore it is possible to implement the arrangement with columns rather than rows or to form a positional correspondence between a row of keys and a column on the screen or a column of keys and a row on the screen.

It must be noted that to replace the letter J with a letter L the erroneous letter i.e. the new editing position is selected with a key, the location of which corresponds the text grouped on the display in a logical way, and in this case it is ignored, what symbols are produced with this corresponding key in the traditional typing manner. This example illustrates the point well, because in input state the three letters D, E and F reside under the key three, but in editing mode the letter J residing under key 5 is selected to be edited. It is also presented here in an exemplary way, how after the selection of the editing position the automatic replacement of the symbol in the editing position with a correcting symbol can be implemented according to an alternative form of the present invention. As an other preferable alternative the selection of the editing position moves the cursor CUR into the editing position. Furthermore, preferably an input state is initiated, where the user is allowed to input a new symbol into the editing position by some means known from prior art. Furthermore, preferably the symbol input now replaces the selected symbol. In this example the pressing of key 3 first selects the symbol to be edited and then changes it into a different symbol. Preferably the replacing character to be selected is the most probable alternative to the symbol to be edited, the next or previous symbol of the same basic key, or e.g. the next or previous symbol in alphabetical or ASCII—(ASCII code, American Standard Code for Information Interchange) order. Thus the first press of key 3 would replace the symbol J with the symbol K and a second press the symbol K to the symbol L. The replacement following the automatic selection of the symbol to be edited is preferably implemented in such a way that the mobile communication unit is arranged to search for the most probable word for the replacement or several replacements made without leaving the editing mode to replace the word which incorporates the replaced letter, and when such a word is found, to replace the edited word with it. Thus it is possible to the user in the best case to replace a word with several erroneous symbols by just replacing one of it's letters. In a favorable case the correct word is found and replaces the edited word with the first keypress corresponding to the erroneous symbol, with the condition that this keypress produces the correct symbol meant by the user in the place of the erroneous symbol. The automatic editing can be expanded to begin searching for a word like this immediately after the replacement, though without prohibiting the receival of other replacements. Thus, preferably a certain time-out is waited, before the word most probably meant by the user found from the last replacement is used to replace the edited word. Thus a selection based on probability with an iteratively increasing accuracy is reached.

Preferably the user is allowed to scroll the edited text by e.g. assigning two keys to specifically act as scrolling keys during the editing mode. Thus the user is able to scroll the text preferably in both direction while editing it and thus easily review and edit even longer passages of text. Preferably, but not necessarily the scrolling takes place forwards or backwards by the number of the symbols included in the matrix.

Figure 4:
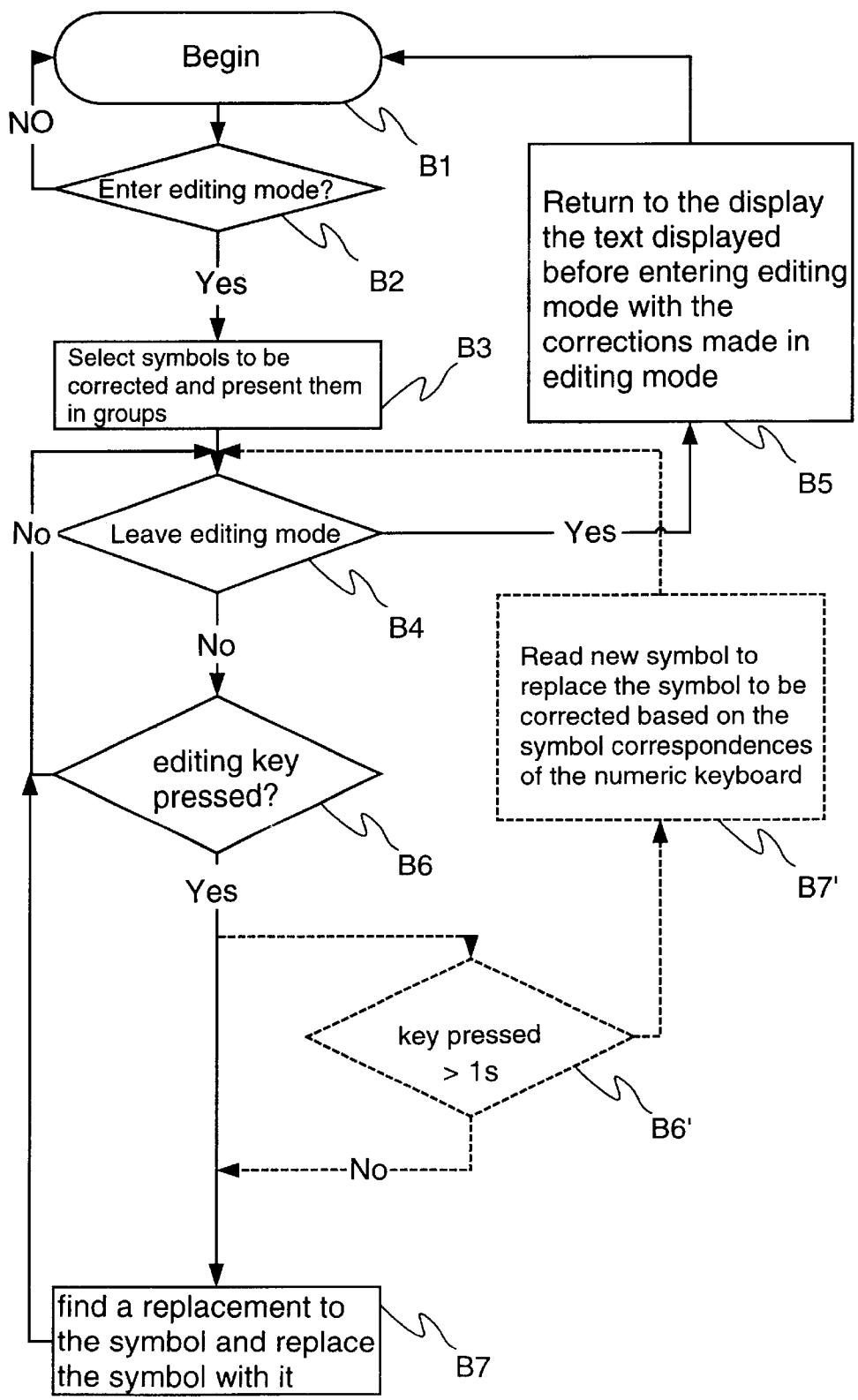
FIG. 4 presents a flow diagram of the operation according to a first and a second embodiment of the present invention combined with automatic correction.

FIG. 4 presents a flow chart of the function of an editing mode according to a first embodiment of the present invention, in which mode the selection of the editing position is followed by an automatic replacement of the symbol. The flow chart also contains an addition represented by a dotted line, that presents the function of an editing mode according to an other embodiment of the present invention. First in the flow chart of the figure is the beginning block B1, where the mobile communication unit is in the typing mode of e.g. SMS, calendar or phone directory entry or some other text. From B1 the execution proceeds to block B2, where the mobile communication unit monitors the state of the editing mode's initiation key, e.g. the star key. When a press of the editing mode's initiating key is observed, the mobile communication unit initiates the editing mode at block 3 by first selecting symbols for replacement and the presenting them on its display group in a defined manner. Preferably the edited symbols are selected by retrieving from memory no more than the maximum amount of symbols that can be handled on-screen in the editing mode preferably from the location of the cursor towards the beginning of the text. Alternatively the symbols may be retrieved from the last input symbol towards the beginning of the text. When the editing mode has been entered, the mobile communication unit begins a loop in block B4, where it monitors the request to end editing mode. If the user issues this command e.g. by pressing the key reserved for this purpose, preferably the same key that initiated the editing mode, execution proceeds to block B5. In block B5 the mobile communication unit returns to display the text that was there before entering the editing mode, with the exception that the corrections made to the part of the text on-screen are incorporated in the returned text. If the command to end the editing mode has not been given, the execution proceeds to block B6, where the mobile communication unit determines whether a key that corresponds to the position of a symbol in the editing mode has been pressed, in this example an number key 1 . . . 9. If not, the execution returns to block B4, otherwise it proceeds to block B7, where the mobile communication unit finds a replacing symbol to the key to be edited, according to a defined rule, with an other symbol next to the presented symbol, replaces the symbol with this other symbol and returns to wait for the command to end editing mode or the next press of an editing key. The above-mentioned rule can at its simplest be e.g. the alphabetical or ASCII-order, but alternatively and preferably a rule based on statistical probability, where the corrected letter is replaced by such a letter (or symbol), which most probably produces the correct word.

In some cases a symbol other than a letter of the edited text can be input as a letter or as an other symbol. Therefore it is optionally possible to allow replacement of other symbols than letters and/or to allow replacing letters with other symbols. Thus hyphens and punctuation marks can be produced with the same keys as letters by using statistical word recognition. In this way the editing can bring apart two words that have been transformed or input as one wrong word. Therefore the editing can correct two words, i.e. generally not only a word to be corrected but a text to be corrected. Preferably the recognition of both words recognised in this way is further attempted in accordance with a correction based on probability or the correction made along with the previous corrections.

In a device according to the second embodiment of the present invention, like the mobile communication units in FIGS. 1–3, the user is allowed to choose between the method of correcting an erroneous symbol presented above and a modification of it. This can be implemented with minor changes by e.g. adding a block B6' between blocks B6 and B7 and add a branch from B6' to a block B7'. The selection can be defined e.g. by the length of the press of a correcting key by using a timer in such a way that a timer is activated when the pressing of the correcting key begins, and then in block B6' it is determined whether the key stays pressed for a defined time-out, e.g. a second. If not, the execution is transferred to the block B7, otherwise the execution proceeds to the block B7'. In B7' the replacing symbol of the symbol to be edited is read by using the correspondences marked in connection with the keyboard and the keys of the symbols, as presented in FIG. 1. When editing the example's word "JAZY" it is now possible to easily replace the letter J produced with the key 5 with the letter G produced with the key 4 simply with one press of the key 4. Let us presume that the wanted word was indeed "HAZY" and now the word "JAZY" has been replaced with the word "GAZY". Block B7' is preferably implemented in such a manner that after reading the press of the key 4 it waits for a certain time, e.g. a second before it returns execution to block B4. During this second time-out the block preferably monitors new keypresses and when detecting one preferably recognises two different situations and acts accordingly. 1) if the key pressed in block B6, in the example the key 4, has now been re-pressed, the replacing symbol for the symbol to be edited is replaced with the next symbol under the appropriate key, in this example with the letter H. 2) if the key pressed now is different than the key pressed in block B6, e.g. key 2, the already read and presented letter G will now be replaced with the first of the symbols produced with the key 2, namely A. Preferably after both alternatives 1) and 2) the program returns to wait the above defined time-out to elapse in order to allow a new correction in case a typing error has taken place in alternative 1) or 2). In this way the user can first select the symbol to be edited from several of the last typed symbols with two keypresses (entering editing mode and selecting the symbol to be edited) and then replace the erroneous symbol with a symbol produced with a totally different key. The recognition of the type of keypress can naturally be done using other known methods, among others double press or pointing the selection before, after or during the keypress by using a key allocated for that purpose.

Figure 5:
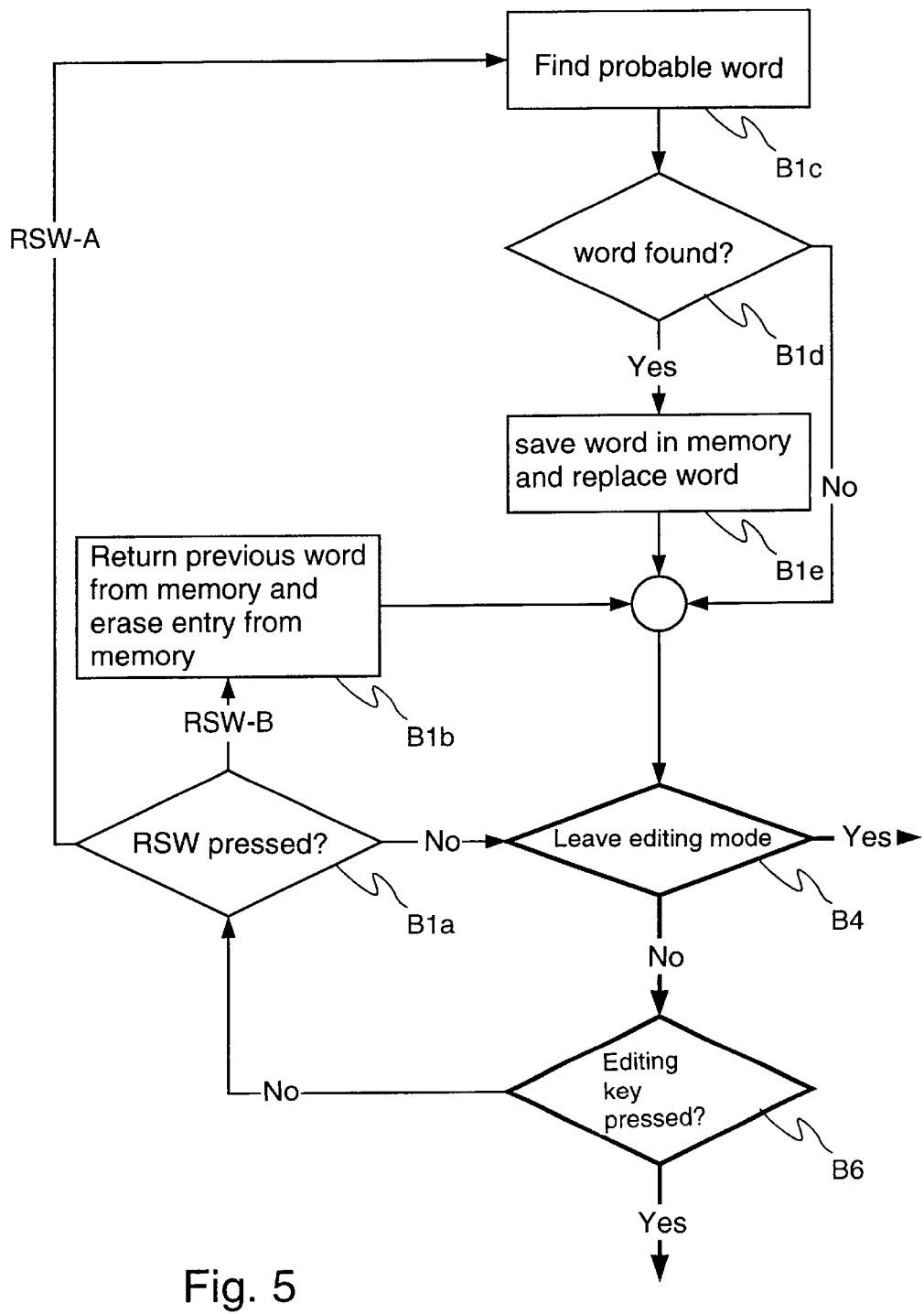
FIG. 5 presents a flow diagram of the operation of a third embodiment of the present invention that is to be added to the flow diagram in FIG. 4.
Figure 6:
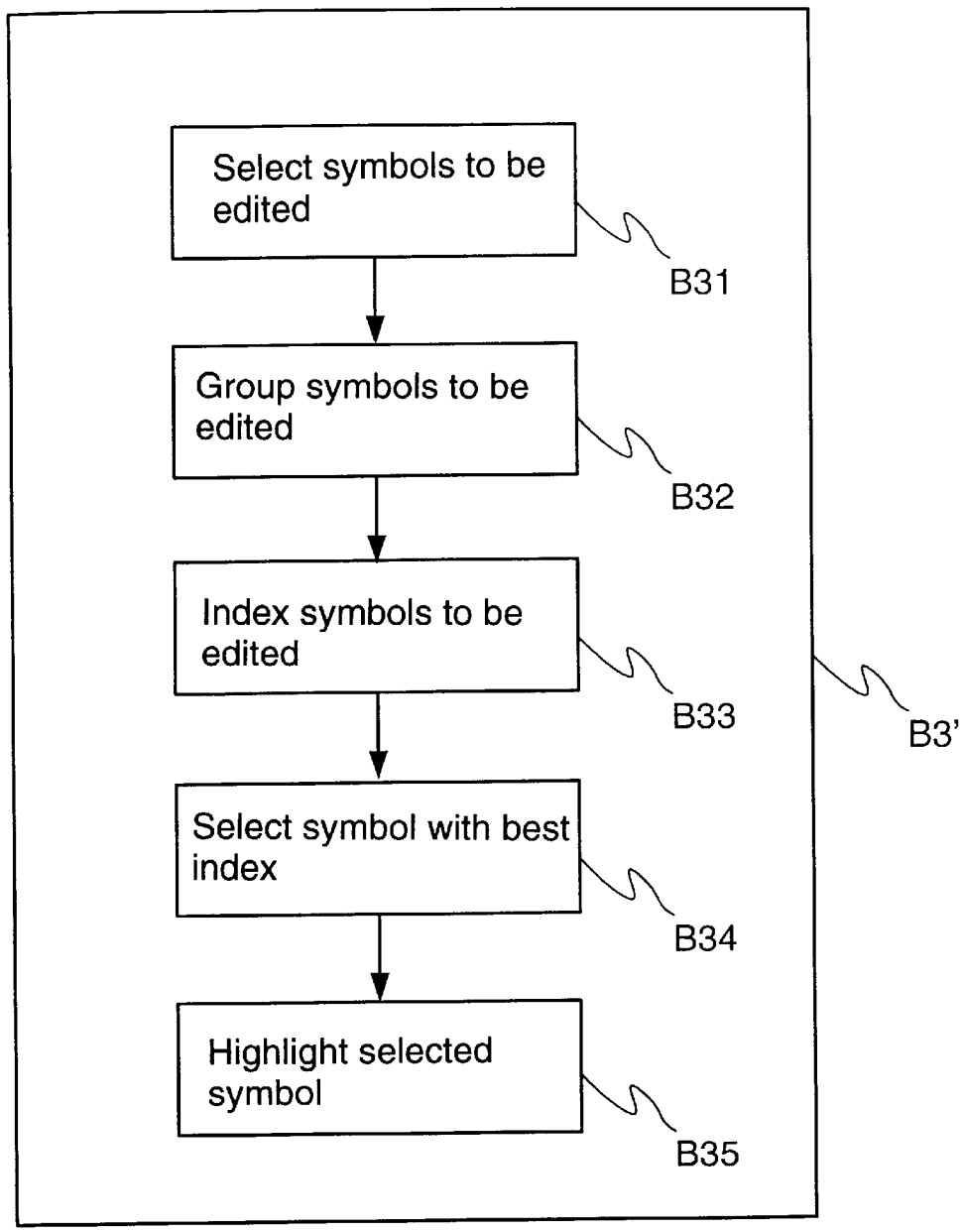
FIG. 6 presents a modified version of the block in FIG. 4 according to a fifth embodiment of the present invention

FIG. 5 presents an addition to the above described one first embodiment, according to a third embodiment of the present invention. In a third embodiment of the present invention the user is allowed to command the device to look for the most probable word for the corrected word after a correction made. This can preferably be implemented e.g. with a rocker switch identical to the one in FIG. 1 in such a way that after a correction made in the editing mode, as a response to a keypress by the user on one side of the rocker switch the most probable word is searched to replace the corrected word, or if this already been done, the next most probable word is searched. In order to explain the figure we start in block B6, where the program determines whether or not a correcting key has been pressed. If not, the embodiment according to a third embodiment of the present invention is started in block B1a, where the program determines whether the rocker switch has been pressed. If not, the execution returns to block B4, otherwise the execution proceeds to the branch RSW-A, if the rocker switch has been pressed on its first side and to the branch RSW-B, if the rocker switch has been pressed on its second side. If the rocker switch has been pressed from its first side, the branch RSW-A first leads to the block B1c where a defined rule, e.g. the probability of sequential letters or a comparison with dictionary words, is used to find a probable word corresponding to the edited word. In B1d the program determines if a probable word was found, and if not, returns to the block B4 in the loop. If yes, the execution proceeds to block B1e, where the present word is saved in memory in an allocated undo-stack and then replaced with the probable word found.

There is a block in the branch RSW-B called B1a, where the previous word is returned from the memory to be presented in the editing mode and removed from the memory, more specifically from the undo-stack in the memory, where it has been saved earlier in the block B1e specially for this kind of an undo-function. The branch RSW-B is not necessary, but it is preferable, because it provides simple means to undo an unsuccessful recognition of a probable word. Preferably several sequential changes can be undone up to when all the replacements, that have been done since the more probable word of the corrected word was edited in the editing mode, have been undone.

In a fourth embodiment of the present invention the retrieval of a probable word after a correction is a default operation, which is always carried out after a correction. This can be implemented with a minor change to the third embodiment of the present invention, where the execution is lead from block B7 in FIG. 4 to block B1c in FIG. 5. Hereby every time that a symbol is replaced, a probable word is searched to replace the corrected word.

In a fifth embodiment of the present invention, entering editing mode starts a search for such a symbol from the symbols of the word which alone has the greatest effect in the choice of the word and the change of which most probably singularly presents the word meant. A block B3' according to the fifth embodiment of the present invention from FIG. 4 is presented in FIG. 5. In block B31 the symbols to be edited are selected by searching backwards from the cursor position i.e. to the left (when writing from left to right) e.g. the last 9 symbols or letters. After this, in block B32, the symbols to be edited are grouped onto the display in a location equivalence with the editing keys on the keyboard, i.e. the keys of a part of the keyboard e.g. 3 rows by 3 columns. Next, in block B33 the symbols to be edited are indexed by a defined rule to show the effect of each symbol to the probability of the word. Preferably this index is one byte i.e. a number 0 . . . 255 and one extremity, e.g. 255 means a critical symbol, the correction of which probably results in a fully correct word, and the number 0 means a word which is probably completely wrong, even if the symbol was corrected. Then, in block B34, a symbol with the best index, i.e. the symbol that most effects the probability of the text or word reached by replacing a single symbol, is chosen. After this, in block B35, the chosen symbol is presented to the user. Optionally more symbols than one can be presented. This is useful especially then, when not one of the symbols is clearly false, or when it is probable that the edited text contains several probably false symbols. In this case it is preferable to where possible mark the most probably wrong symbol with one way and the other probably wrong symbols with another way, so that the user receives the information, which symbol is probably most preferable to be replaced first.

Preferably in a third, fourth and fifth embodiment of the present invention the corrections made by the user in the editing mode are saved in the memory and these changes are considered compulsory when selecting the most probable word. Thus, if the user has specifically selected the letter A to be the second letter of a five-letter word, it is not replaced even though replacement through indexing would seem to more probably produce the desired word.

In a special case with a touch-screen the display and the keyboard of the device can be combined. Understandably in this case a complete correspondence is created between the text to be edited and the keys used in editing. Preferably when using a touch-screen the text is divided into a loose matrix to prevent mixing of parallel symbols. As such, when using a touch-screen, the invention can be implemented otherwise as has been described before with a separate display and keyboard, except the selection of basic key according to the second embodiment of the present invention must be implemented by changing some of the 'keys' of the touch-screen to so called Soft Keys. In this case preferably the part of the text to be edited is scrolled onto the edge of the display, e.g. to the upper or lower edge, and the alternative symbols or symbol groups are shown on different soft keys, thus allowing the user to select a new 'basic key' to input a symbol other than the ones in the previous symbol set.

In a special case the present invention can also be used in a device, that receives the text as speech employing speech recognition instead of an ordinary keyboard. A device like this does not necessarily have to comprise a keyboard, if it comprises a touch-screen. In this case according to the present invention the device can be commanded into editing mode with a defined word, e.g. "edit". In editing mode the device presents on-screen, in a way essentially described above, a part of the input text, with the exception, however, that the symbol to be corrected is corrected by touching the screen at its position. In this particular case the areas on the touch-screen surface marked in the position of the letters function as keys and form the parallel key matrix, that was described in the examples above, whose grouping corresponds to the placing of the symbols onscreen.

It must be understood that the editing mode according to the present invention is well applicable alongside an ordinary editing method without hindering the use of editing techniques known from prior art. If desired, the editing method according to the present invention can be arranged to complement an editing method according to prior art, e.g. the method known from Nokia 2110, where the cursor is first moved with keypresses to the position of the symbol to be corrected, and then editing or replacing and adding of symbols with a method according to the present invention is initiated. Alternatively the method can even be applied to the symbols following the editing position then, when the cursor has been moved in an already typed text towards its beginning.

Here the embodiment and implementations of the present invention has been presented with the aid of examples. It is evident to a man skilled in the art that the present invention is not confined to the details of the embodiments presented above and that the present invention can be implemented in an other form without deviating from the identifying features of the present invention. The embodiments presented should be regarded as illuminating, but not confining. For example in the selection of the edited text spaces between words realised with punctuation marks and spaces can be exploited, and other parts of the text presented as edited can also be exploited in search of probable words, even if they were not presented in editing mode. Thus, only the enclosed patent claims confine the possibilities to implement and use the present invention. Hereby the different embodiments of the present invention, including equivalent embodiments are included within the area of the present invention.

What is claimed is:

1. A method to edit input text by using an input device, which has a keyboard to input text and a display unit to display the input text, in which method no more than a first amount of symbols from the input text, grouped in a defined first configuration is displayed on the display, wherein said first amount of keys of the keyboard are grouped into editing keys in a defined second configuration;

a singular locational correspondence is formed between the symbols arranged into said first configuration and the locations of the editing keys grouped into said second configuration, where each editing key corresponds to one location of a grouped symbol; and as a response to the use of an editing key, the location of a grouped symbol corresponding to the editing key is selected as an editing position, wherein said input device is a button telephone and the keyboard is the number keyboard of a telephone.

2. A method according to claim 1, wherein said first configuration is a first matrix comprising X columns and Y rows;

said second configuration comprising X columns and Y rows is a second matrix corresponding the first matrix; and said defined correspondence is defined by selecting from the first configuration the symbol that is on the same row and in the same column as the editing key in the second configuration.

3. A method according to claim 1, wherein as a response to the use of an editing key the symbol in the editing position is additionally replaced with a correcting symbol, which is one of the following:

a symbol that in order follows the symbol to be edited in a same partial unit of the alphabet;

a symbol that in order preceeds the symbol to be edited in a same partial unit of the alphabet;

a symbol that follows the symbol to be edited in alphabetical order;

a symbol that preceeds the symbol to be edited in alphabetical order;

a symbol that preceeds the symbol to be edited in ASCII (American Standard Code for Information Interchange) order;

a symbol that follows the symbol to be edited in ASCII (American Standard Code for Information Interchange) order; and a most probable symbol according to a defined rule.

4. A method according to claim 1, wherein the method comprises two modes, of which the first is an editing mode;

to select the symbol corresponding to the location of the corrected symbol and the other is an input mode to input text;

the initiation command of the editing mode given by the user is read;

as a response to the editing mode initiation command editing mode is initiated; and the input mode is initiated as a response to the selection of said editing position, in order to allow the input of the symbol selected by the user to said editing position.

5. A method according to claim 1, wherein the user is allowed to scroll the symbols displaying the input text, grouped according to the first configuration, in order to extend the editing in to a larger part of the input text than the part being displayed at a time.

6. An input device that has a keyboard to input text and a display unit to display the input text, which input device comprises first means to display no more than a first amount of symbols in the input text on the display unit grouped according to a defined first configuration, wherein said keyboard comprises said first amount of keys grouped as editing keys according to a defined second configuration; and that the input device comprises:

means for defining a singular correspondence between the symbols grouped according to said first configuration and the keys grouped according to said second configuration, where each key corresponds to the location of one grouped symbol;

means for selecting the location of the symbol corresponding to the editing key as the editing position, in response to the use a editing keys, wherein said input device is a button telephone and the keyboard is a telephone's number keyboard.

7. An input device according to claim 6, wherein said first configuration is a first matrix comprising x columns and Y rows;

said second configuration is a second matrix corresponding to the first matrix comprising x columns and Y rows; and said defined correspondence is a correspondence between the units defined by correspondence rows and columns in the configurations.

8. An input device according to claim 6, wherein in the input comprises third means to replace the symbol in the editing position with a corresponding symbol in response to the use of an editing key, which correcting symbol is one of the following:

a symbol that in order follows the corrected symbol in the same partial unit of the alphabet;

a symbol that in order preceeds the corrected symbol in the same partial unit of the alphabet;

a symbol that follows the corrected symbol in alphabetical order;

a symbol that proceeds the corrected symbol in alphabetical order;

a symbol that proceeds the corrected symbol in ASCII (American Standard Code for Information Interchange) order;

a symbol that follows the corrected symbol in ASCII (American Standard Code for Information Interchange) order; and a most probable symbol according to a defined rule.

9. An input device according to claim 6, wherein said means have at least two modes, an editing mode to select the symbol corresponding to the position of the corrected symbol and in input mode to input text;

input device comprises fourth means for giving the editing mode initiation command given by the user;

as a response to the issuing of said initiation command said first means have been arranged to enter editing mode to display said first amount of symbols; and as a response the the selection of the editing position said embodiment means have been arranged to enter said input mode in order to allow the input of the user-selected symbol into the editing position.

10. A input device according to claim 6, wherein the input device comprises:

means for allowing to user to scroll the symbols of the input text arranged according to the first configuration in order to extend the editing to a large part of the text than the part displayed at a time.

* * * * *

UNITED STATES PATENT AND TRADEMARK OFFICE
CERTIFICATE OF CORRECTION

PATENT NO. : 6,760,012 B1
DATED : July 6, 2004
INVENTOR(S) : Laurila

It is certified that error appears in the above-identified patent and that said Letters Patent is hereby corrected as shown below:

Column 12,
Line 19, 23 and 25, please replace "preceeds" with -- precedes --
Line 34-35, between "mode" and "to" please remove ";"

Column 13,
Line 3, please replace "a" with -- of --
Line 7 and 10, please replace "x" with -- X --
Line 13, please replace "correspondence" with -- corresponding --
Line 16, please replace "in the input comprises third means to replace the symbol" with
-- the input device comprises third means to replace the symbol --
Line 17, please replace "corresponding" with -- correcting --
Line 22, please replace "preceeds" with -- precedes --
Line 25, please replace "large" with -- larger --
Line 26, please replace "proceeds" with -- precedes --

Column 14,
Line 1, please replace "proceeds" with -- precedes --

Signed and Sealed this

Twelfth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,760,012 B1
DATED : July 6, 2004
INVENTOR(S) : Laurila

It is certified that error appears in the above-identified patent and that said Letters Patent is hereby corrected as shown below:

Column 12,
Line 19, 23 and 25, please replace "preceeds" with -- precedes --
Line 34-35, between "mode" and "to" please remove ";"

Column 13,
Line 3, please replace "a" with -- of --
Line 7 and 10, please replace "x" with -- X --
Line 13, please replace "correspondence" with -- corresponding --
Line 16, please replace "in the input comprises third means to replace the symbol" with
-- the input device comprises third means to replace the symbol --
Line 17, please replace "corresponding" with -- correcting --
Line 22, please replace "preceeds" with -- precedes --
Line 25, please replace "large" with -- larger --
Line 26, please replace "proceeds" with -- precedes --

Column 14,
Line 1, please replace "proceeds" with -- precedes --

Signed and Sealed this

Nineteenth Day of October, 2004

JON W. DUDAS
*Director of the United States Patent and Trademark Office*